Aug. 4, 1970      C. D. RUSSELL      3,522,583
MIRROR CONTROLLER FOR VEHICLES ACTUATED IN RESPONSE TO
THE POSITIONING OF THE TURN SIGNAL LEVER
Filed Oct. 26, 1966

INVENTOR
CARL D. RUSSELL

BY Wilfred H. Caldwell

ATTORNEY

United States Patent Office 3,522,583
Patented Aug. 4, 1970

3,522,583
MIRROR CONTROLLER FOR VEHICLES ACTUATED IN RESPONSE TO THE POSITIONING OF THE TURN SIGNAL LEVER
Carl D. Russell, 1209 Walnut St.,
Muskogee, Okla. 74401
Filed Oct. 26, 1966, Ser. No. 589,608
Int. Cl. B60q 1/40
U.S. Cl. 340—98                                    1 Claim

ABSTRACT OF THE DISCLOSURE

The invention comprises a vehicular mirror assembly to angle the mirror in opposite directions under control of the turn indicator switch from the vehicle battery. A pair of electromagnets is affixed in spaced apart relation to the rear side of the mirror. A stub protrudes from the rear side of the mirror and a supporting shaft is partially connected to the stub and is attached to the vehicle. A magnetizable bar is disposed in spaced apart relation to the electromagnets and carried by the shaft. A switching circuit is responsive to operation of the turn indicator switch for energizing a selected electromagnet to angle the mirror in a selected direction by attraction to the bar.

---

Figure 1:
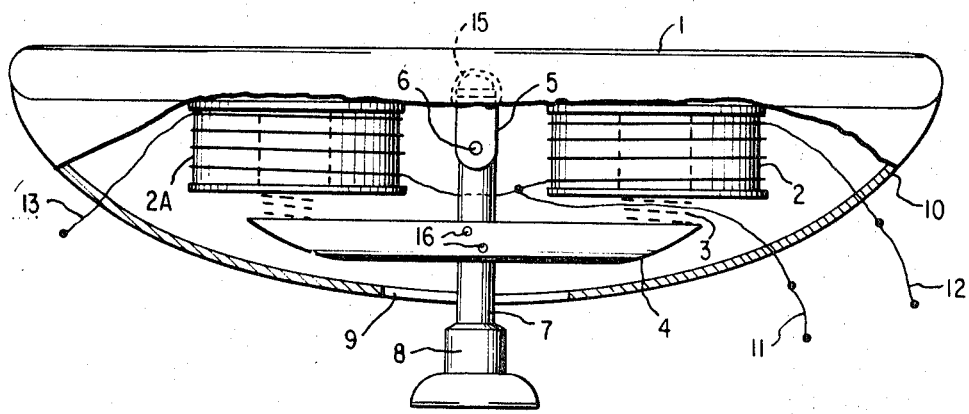

The present invention relates to a device for angling a rear-view vehicular mirror in order to avoid blind areas, particularly when the vehicle is being turned to the right or left. While numerous inventions have been made in the field, the present invention is in the nature of a new type mirror arrangement or housing which may employ a conventional mirror, of a type more particularly suitable for manufacture and installation on new vehicles. The invention provides a relatively simple and inexpensive but effective apparatus for achieving the desired result.

The device of this invention enables the mirror to be angled to the right or to the left in accordance with the turn indicator signal current flow upon operation of the indicator. It achieves this action through the use of a pair of electromagnets with coils actuated from the electrical system of the car, under the control of the turn indicator signal lever in either signalling position. A right-hand turn indication energizes one coil to angle the mirror in one direction, and a left-hand turn indication energizes the other coil thereby causing the mirror to be angled in the other direction. Centering springs are provided for returning the mirror to its normal position which has been set by the operator when he entered the vehicle as his own preferred position.

A feature of the invention resides in the use of the turn indicator circuitry of the vehicle in slightly modified manner to achieve a perfect operating control for energizing the selected coil. Present day vehicles include a single thermal-switch in the lead extending to the turn indicator switch. The purpose of this thermal-switch is to blink the indicator lights intermittently off and on. The single switch is sufficient because it is located in the common lead and whether or not a right or left turn is indicated, it will blink the desired set of turn lights.

The present invention contemplates the use of two thermal-switches in lieu of the single conventional thermal-switch. These switches in lieu of the single conventional thermal-switch. These switches are disposed in the lead lines from the turn indicator switch to the various lights in the sets on either side; i.e., front, back, and dash turn lights. The mirror mounted electromagnet coils are energized from the leads extending respectively to the right-hand turn and left-hand turn signalling lamps. It is important to note that these coils complete a circuit to or from ground before these main circuits include the thermal-switches, respectively. In this manner, the intermittent operation of the lights will not be reflected into the electromagnet energizing circuits, but the conventional existing circuitry is useable for the necessary control herein described.

Preferably, the electromagnets are fixed to the rear surface of the mirror itself in spaced apart position, offset from the vertical center of the mirror. Conventional type mounting structure may be utilized between the mirror and the vehicle, for example, including a universal connection from the mirror to a shaft and being provided also with a pivot connection for angling the mirror relative to the shaft. The shaft in turn, is rigidly fixed to the vehicle, such as by direct mounting to the windshield glass or in any other suitable way, but this shaft carries additionally a cross member rigidly fixed thereto and of magnetizable material or at least carrying magnetizable iron slugs or the like opposite the coils. Thus, when a coil is energized, it angles the mirror by moving to or at least toward the fixed cross member or magnetizable slug pivoting that end of the mirror along with it. The centering springs are preferably disposed between electromagnets and the cross member, respectively.

The foregoing components are desirably housed in a shell, which, of course, includes a slot for the mounting shaft of suitable dimensions to permit the angling operation.

With the foregoing in mind, it will be appreciated that it is an object of this invention to provide an electrically controlled mirror angling apparatus capable of angling a mirror in response to the turn indicator lever.

Another object of the invention is the provision of such a structure readily adapted to operation from conventional turn indicator circuitry.

Figure 2:
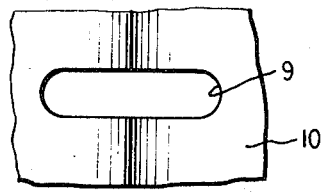
Figure 3:
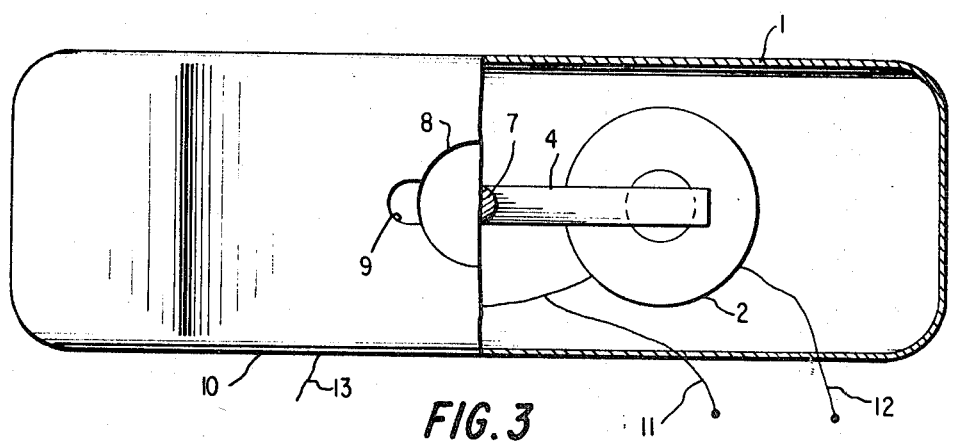
Figure 4:
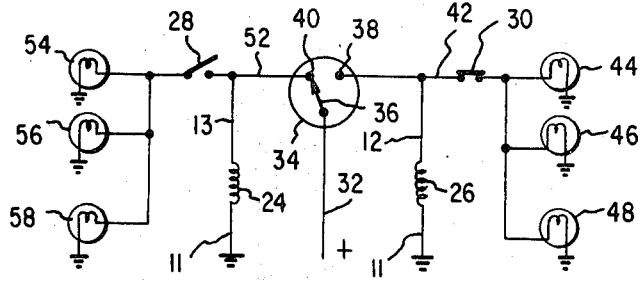

The foregoing will be more apparent from a reading of the following detailed description of the invention, when taken in light of the accompanying drawing, wherein:

FIG. 1 is a view partly in top plan and partly in section to show the components within the housing, FIG. 2 is a detailed view showing a slot through the housing, FIG. 3 is a rear elevational view of the structure of FIG. 1 partly broken away to show internal components thereof, and FIG. 4 shows the electrical control circuitry for operating this apparatus.

Referring now to the drawing, and in particular to FIGS. 1 and 3, the conventional rear view mirror 1 is provided with electromagnets 2 and 2A affixed to the rear side thereof in spaced apart positions. Centering springs 3 are disposed between electromagnets 2, 2A, and cross member 4, which is fixed to shaft 7. These springs may be retained in any manner desired, such as being glued or otherwise affixed to one of the two surfaces between which they extend.

The mirror 1 which actually comprises glass in a cover, incorporates the universally mounted structure 15 extending outwardly as stub 5. A shaft 7 is connected to stub 5 at pivot 6 to permit angling of the mirror relative to the shaft. A suction cup 8, or other means of attachment, is affixed to the shaft 7 to connect the mirror and housing 10 to the vehicle. Angling is permitted by a slot 9 for shaft 7 in housing 10 which permits housing 10 to angle with the mirror 1 while shaft 7 remains stationary.

Crossbar 4 is pinned or otherwise affixed to shaft 7 by the pins 16 so that it remains stationary to permit the magnets to move toward it.

The material of the crossbar 4 may be of iron or other magnetizable material or it may incorporate iron slugs opposite the coils 2 and 2A.

In the circuit of FIG. 4, all wiring and components are conventional with the exception of leads 11, 12 and 13, electromagnet coils 24 and 26 and thermal- or interrupter-switches 28 and 30, which have been used to replace the conventional thermal-electrical switch (not shown) normally disposed in lead 32, usually referred to as the hot lead.

The mounting panel 34 is the usual one on the steering wheel column (not shown) and includes turn indicator switch arm 36 adapted to connect to terminal 38 when signalling for a turn in one direction and to terminal 40 when signalling a turn in the opposite direction.

Main lead 42 extends from terminal 38 for right front turn indicator lamp 44, dash board indicator light 46 and the right rear indicator lamp 48, all lamps being grounded to complete the energization paths. Similarly, left main lead 52 is provided to energize left front lamp 54, dashboard light 56 and left rear tail lamp 58.

It is important to note that leads 12 and 13 are connected to leads 42 and 52 to complete their respective circuits to ground without interruptions by the thermal-switches 28 and 30 which provide the intermittent signalling.

Thus, it is apparent that with a minimum of modification the conventional circuitry has been adapted to angle the mirror.

What is claimed is:

1. An electrical circuit for angling a vehicular mirror in opposite directions relative to the vehicle operable from the vehicle electrical system with the indicator lamps comprising in combination, a turn indicator switch arm, adapted to be switched to one of two positions, said one position being indicative of the signalling for a right-hand vehicular turn and said other position being indicative of the signalling for a left-hand vehicular turn; a lead connecting said switch to one polarity of the vehicular electrical system; a pair of contacts for said switch arm respectively corresponding to said signalling; a right lead extending from one of said contacts to one of the indicator lamps; a lead extending from said lamp to the other polarity of the system; a first electromagnet coil disposed to angle said mirror in one direction when energized; a lead extending from the right lead to said coil and a lead extending from said electrical coil to said other polarity of the system; a thermal-switch disposed in said right lead between the lead extending to the coil and said right-hand indicator lamp; at least one left-hand indicator lamp; a left lead connected from the other of said contacts to said left-hand indicator lamp; a lead extending from said left lamp to the other polarity of the system; a further electromagnet coil connected to the left lead disposed to angle said mirror in the opposite direction when energized; a lead extending from said further coil to the other polarity of the system; and a thermal-switch disposed in said left lead between said left-hand indicator lamp and the connection to the further electromagnet coil.

References Cited

UNITED STATES PATENTS

| | | | |
|---|---|---|---|
| 2,968,024 | 1/1961 | Pearsall | 340—74 X |
| 3,199,075 | 8/1965 | Simmons | 340—98 |

DONALD J. YUSKO, Primary Examiner

M. SLOBASKY, Assistant Examiner

U.S. Cl. X.R.

340—74